United States Patent [19]

Toyama et al.

[11] Patent Number: 4,558,399
[45] Date of Patent: Dec. 10, 1985

[54] ELECTROLYTIC CAPACITOR AND A PROCESS FOR PRODUCING THE SAME

[75] Inventors: Tatsuro Toyama, Kanagawa; Masayuki Fujiwara, Tokyo, both of Japan

[73] Assignees: Nippon Chemi-Con Corporation; Hitachi Limited, both of Japan

[21] Appl. No.: 435,186

[22] Filed: Oct. 19, 1982

[30] Foreign Application Priority Data

Oct. 19, 1981 [JP] Japan .................................. 56-166654
Oct. 19, 1981 [JP] Japan .................................. 56-166655

[51] Int. Cl.⁴ .............................................. H01G 9/00
[52] U.S. Cl. ...................................... 361/433; 29/570
[58] Field of Search ....................... 361/433, 278, 306; 29/570

[56] References Cited

FOREIGN PATENT DOCUMENTS 1219881  1/1971  United Kingdom ................ 361/433

Primary Examiner—Russell E. Adams
Assistant Examiner—Douglas S. Lee
Attorney, Agent, or Firm—Sughrue, Mion, Zinn, Macpeak, and Seas

[57] ABSTRACT

An electrolytic capacitor includes a capacitor element having a pair of lead terminals, a thermoplastic synthetic resin cases enclosing the element therein and a thermosetting synthetic resin coating formed on the thermoplastic synthetic resin cases with the lead terminals being extended outwardly. The thermosetting synthetic resin coating formed on the thermoplastic resin cases provides fine affinity with the lead terminals and encloses the capacitor element enclosed in the thermoplastic resin cases airtightly with the lead terminals being extended outwardly.

8 Claims, 8 Drawing Figures

ELECTROLYTIC CAPACITOR AND A PROCESS FOR PRODUCING THE SAME

BACKGROUND OF THE INVENTION

This invention relates to an electrolytic capacitor and, more particularly, to an improvement in a chip-type electrolytic capacitor enclosed in a synthetic resin impervious to liquid.

With the recent development of ICs, electric and electronic components to be used therewith have been becoming smaller and smaller. For the electrolytic capacitor, a very small capacitor element has been manufactured by winding electrode foils each of, for example, a few milimeters in width into a cylindrical shape of 5 mm or less in diameter. In such case, the electrolytic capacitor element is normally moulded with a synthetic resin instead of being encapsulated in an aluminum case to form the final capacitor. Unlike other electronic components, however, an electrolytic capacitor requires special care because of its polar construction and impregnation with an electrolyte. That is, the mould of the electrolytic capacitor element with the synthetic resin must be performed liquid-tightly in order to keep its electrical properties such as capacitance constant. Specifically, since, with a passage of electric current through the electrolytic capacitor element, hydrogen gas is generated due to electrolysis of the electrolyte, the mould of the electrolytic capacitor must be kept airtight enough to withstand increase in inner pressure caused by generation of gas as well as to prevent evaporation of the electrolyte and contamination by foreign impurities.

In moulding the electrolytic capacitor element with a synthetic resin, the affinity of terminals or metal plates extending outwardly from the element with the resin is the key factor to the airtightness of the mould. When the miniaturization of the electrolytic capacitor element causes the metal terminal plates to be designed smaller in size, the affinity between the resin and the metal plates becomes more severe. Since thermoplastic resin is generally poor compared with thermosetting synthetic resin in its affinity with metals, the moulding with a thermoplastic resin can be poor in airtightness. In that sense, a use of thermosetting resin is preferrable. For the moulding with thermosetting resin, the curing temperature of thermosetting resin is as high as 150° C. to 180° C. Therefore, when the electrolytic capacitor element impregnated with electrolyte is moulded with the resin and heat-treated into the heated resin at such high temperature, the electrolyte evaporates. In order to avoid this, the impregnation with electrolyte should be performed after the moulding is completed. However, since the electrolytic capacitor element is moulded with thermosetting resin under a pressure of about 100 kg/cm$^2$, the elements is compressed and tightened causing a subsequent impregnation with the electrolyte to be very difficult, resulting in that a desired capacitance of a resultant capacitor can not be obtained and dielectric dissipation factor (tan δ) thereof becomes too large. Furthermore, the compression may damage the oxide layer on the electrodes, resulting in an increase of leakage current. In addition, the resin mould may have a hole through which the electrolyte can be introduced to the element inside the mould. Such a hole is very hard to be closed after the introduction of the electrolyte, leading to a poor airtightness.

SUMMARY OF THE INVENTION

An object of the present invention is to provide an electrolytic capacitor capable of being kept airtight, which is moulded with thermosetting resin to utilize a desired affinity thereof with metal leads. The capacitor element is covered by a thermoplastic resin and then a coating of a thermosetting synthetic resin is provided on the thermoplastic resin to cover the thermoplastic synthetic resin substantially.

Another object of the present invention is to provide a method of manufacturing the electrolytic capacitor. The method comprises enclosing an electrolytic capacitor element, together with a part of terminals thereof, in a reception space defined in a case formed of a thermoplastic synthetic resin and having a hole, covering the surface of said case and said terminals with a thermosetting synthetic resin leaving the hole, introducing an electrolyte into the reception space through the hole, and closing the hole.

BRIEF DESCRIPTION OF THE DRAWINGS

FIGS. 7(A) and (B) is a view illustrating the process of plugging a through-hole.

DETAILED DESCRIPTION OF THE PREFERRED EMBODIMENT

The invention will be now described in detail with reference of the accompanying drawings.

Figure 1:
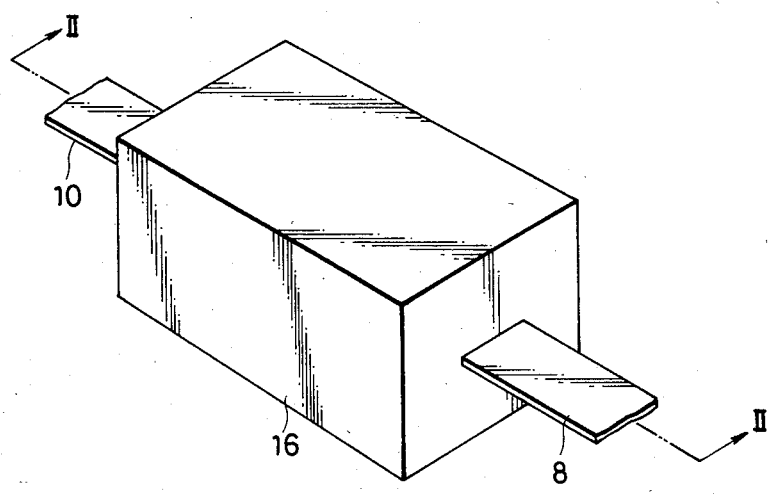
FIG. 1 is a perspective view showing an embodiment of the electrolytic capacitor of the present invention.
Figure 2:
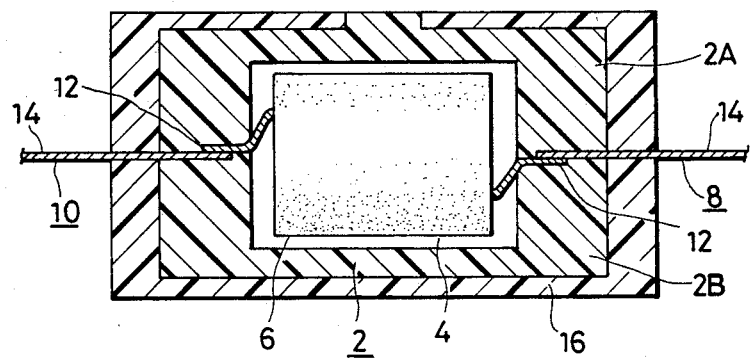
FIG. 2 is a sectional view taken on line II—II of FIG. 1.

FIGS. 1 and 2 show an embodiment of the electrolytic capacitor of the present invention in which FIG. 1 is a perspective view showing the external shape of the electrolytic capacitor and FIG. 2 is a sectional view taken on line II—II of FIG. 1.

Referring to FIGS. 1 and 2, the capacitor includes a capacitor element 6 having a pair of lead terminals 8 and 10 impregnated with electrolyte, a case 2, and an outer coating 16. The case 2 is of a thermoplastic resin such as polypropylene, noryl(modified polyphenylene oxide), nylon(polyamide), PBT(polybutylene terephthalate), or PPS(polyphenylene sulfied). The capacitor element 6 is enclosed in a space 4 defined by the case 2. The capacitor element 6 is formed by winding anode and cathode foils separated by, for example, a paper spacer into a cylindrical shape. Terminals 8 and 10 which are connected to the anode and the cathode of the electrolytic capacitor element 6 respectively are led from the opposing ends of the electrolytic capacitor element 6 to the outside of the case 2 and extend through the outer coating 16. In this embodiment, each of the terminals 8 and 10 comprises an internal lead wire 12 directly connected to the electrode foil and an external lead wire 14. The internal lead wire is made of the same metal to that of the electrode foil and the external lead wire 14 is made of, for example, a solderable metal. Both the lead wires 12 and 14 are in the form of a strip. The internal lead strips 12 bonded to the external lead strips A by means of cold pressing, welding or the like. The outer surface of the case 2, except a portion thereof, is covered with a thermosetting synthetic resin layer 16 of epoxy, phenol or the like. The lead strips 8 and 10 may be used as face bonding terminals.

Figure 3:
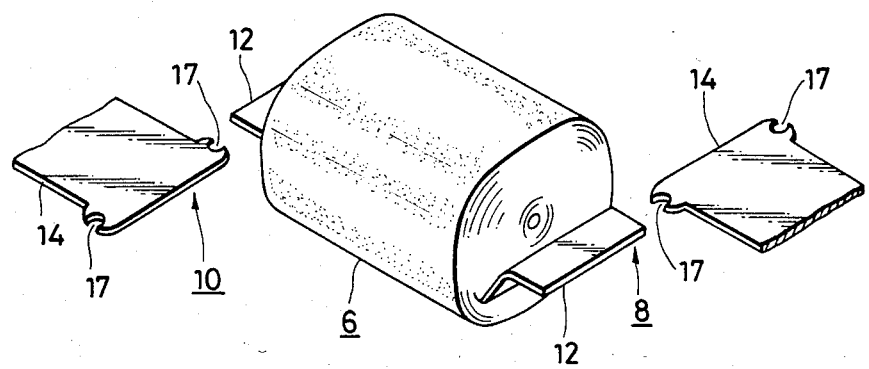
FIG. 3 is a perspective view showing the construction of an electrolytic capacitor element and its terminals.

FIGS. 3 through 7 show the steps of manufacturing the electrolytic capacitor in FIGS. 1 and 2. In FIG. 3, the lead strips 12 led from the capacitor element 6 are bent so as to be disposed along a center longitudinal plane of the electrolytic capacitor element 6. The external lead strips 14 are welded to the respective internal lead strips 12. The external lead strips 14 have concavo-convex portions 17 formed on both sides of the end portions thereof. The effect of the concavo-convex portions 17 will be described later.

Figure 4:
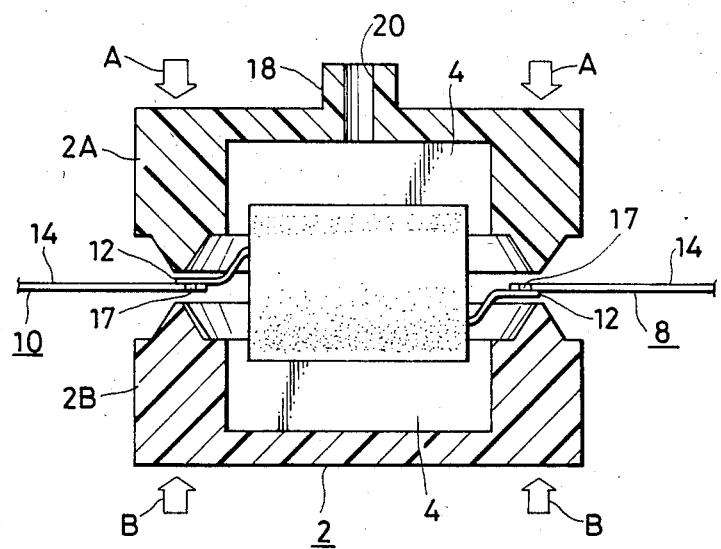
FIG. 4 is a view illustrating the process of enclosing the electrolytic capacitor element.

The case 2 is formed by thermally or ultrasonically welding two case halves 2A and 2B together under pressure. The case half 2A has a recess formed inside thereof and a protrusion 18 including a through-hole 20 and the case half 2B has a corresponding recess. When the halves are welded together, these recesses define a reception space 4 for receiving the element 6 as shown in FIG. 4. Formed on the central part of the outer surface of the case half 2A is a small diameter protrusion 18 having a through-hole 20 for the introduction of an electrolyte into the reception space 4. In encapsulating the electrolytic capacitor element 6, the halves 2A and 2B are thermally or ultrasonically welded to each other as mentioned, with the element 6 having the terminals 8 and 10 being disposed therebetween. At this time a melted thermoplastic resin fills the concavo-convex portions of the lead strips 14 so that the lead strips are firmly fixed in their places after the welding is completed.

Figure 5:
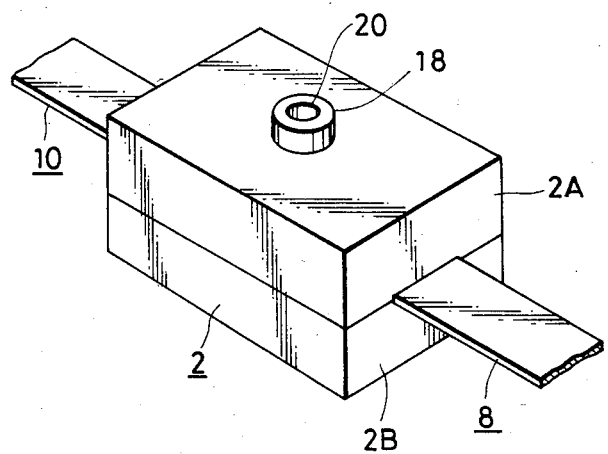
FIG. 5 is a view of the electrolytic capacitor element enclosed in a case.
Figure 6:
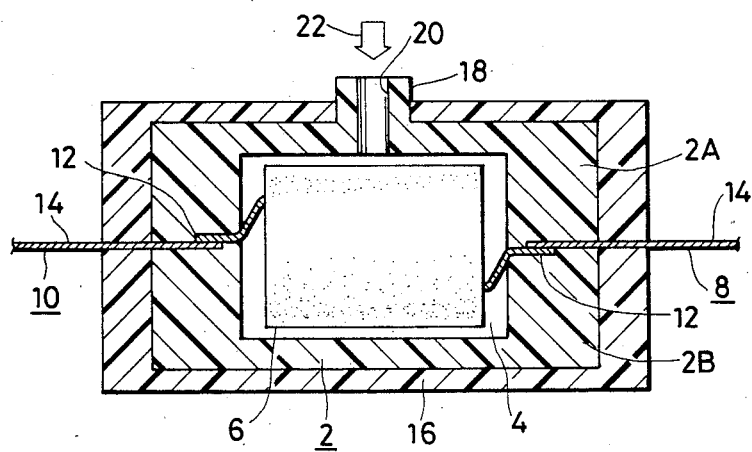
FIG. 6 is a section of the electrolytic capacitor which is not impregnated with an electrolyte yet.

Thus, the element 6 is enclosed in the case 2 as shown in FIG. 5. The outer surface of the case 2, except an area of the protrusion 18 formed with the through-hole 20, is then coated with thermosetting synthetic resin 16. Thereafter, an electrolyte 22 is introduced into the space 4 through the hole 20 as shown by an arrow 22 in FIG. 6, whereby the electrolytic capacitor element 6 is impregnated therewith.

In impregnating the element 6 with the electrolyte 22, it is desired to evacuate the inside of the case 2 prior to the introduction of the electrolyte 22 therein. The impregnation may be facilitated by heating the electrolyte to lower the viscosity thereof and/or ultrasonically vibrating the case to promote the movement of the electrolyte.

After impregnation is completed, a conical plug 24 of thermoplastic synthetic resin is inserted into the hole 20 as shown by an arrow A in FIG. 7A and then thermally or ultrasonically welded under downward pressure. Thereafter the protrusion 18 is removed as shown in FIG. 7B.

As above-mentioned, the case 2 of thermoplastic synthetic resin encapsulating the capacitor element having the terminals 8 and 10 is covered with the thermosetting synthetic resin 16 before the electrolyte is introduced into the case. The thermosetting synthetic resin 16 thus formed provides high airtightnesses to both the joint portion of the case halves 2A and 2B and the portions of the terminals 8 and 10, so that the evaporation of the electrolyte of the capacitor element and the contamination thereof due to foreign impurities are prevented.

Furthermore, since the dimension of the space 4 defined in the case 2 is selected as bigger than the size of the element 6 and the thermosetting synthetic resin layer 16 is formed on the case 2 after the connection of the case halves 2A and 2B and before the impregnation is performed, any undesired compression of the element 6 or damage to the oxide film thereof can be prevented and a complete impregnation with the electrolyte is ensured, eliminating possible defects such as lower capacitance and higher dissipation factor (tan δ) than those expected. And the prevention of damages to the oxide film can minimize leakage current. Thus, the electrolytic capacitor excellent in electrical properties can be obtained.

What is claimed is:

1. An electrolytic capacitor comprising:
   a capacitor element including a pair of opposing electrodes composed of foils and a pair of lead terminals extending from said electrodes respectively;
   a thermoplastic synthetic resin case member having a space therein in which said capacitor element is fixedly disposed with said lead terminals being extended outwardly;
   a thermosetting synthetic resin coating formed on said thermoplastic synthetic resin case to mould at least said lead terminals airtightly; and
   an electrolyte impregnating said element;
   wherein each of said terminals comprises an internal portion, one end of which is connected to a corresponding one of said electrodes and an external portion having one end connected to the other end of said internal portion and the other end exposed outside said coating; and
   wherein a junction portion of said internal and external portions is encapsulated in said case member with no intervening voids.

2. An electrolytic capacitor as claimed in claim 1, wherein said thermoplastic synthetic resin is selected from a group consisting of polypropylene, noryl, nylon, PBT and PPS.

3. An electrolytic capacitor as claimed in claim 1, said thermosetting synthetic resin is selected from a group consisting of epoxy and phenol.

4. An electrolytic capacitor as claimed in claim 2, said thermosetting synthetic resin in selected from a group consisting of epoxy and phenol.

5. An electrolytic capacitor comprising:
   a capacitor element including a pair of opposing
   a thermoplastic synthetic resin case member having a electrodes composed of foils and a pair of lead terminals extending from said electrodes respectively, space therein in which said capacitor element is fixedly disposed with said lead terminals being extended outwardly;
   a thermosetting synthetic resin coating formed on said thermoplastic synthetic resin case to mould at least said lead terminals airtightly; and
   an electrolyte impregnating said element;
   wherein each of said terminals comprises an internal portion, one end of which is connected to a corresponding one of said electrodes and an external portion having one end connected to the outer end of said internal portion and the other end exposed outside said coating;
   wherein a junction portion of said internal and external portions is encapsulated in said case member; and wherein said external portion has concavo-convex portions on both sides at said junction point.

6. An electrolytic capacitor as claimed in claim 5 wherein said thermoplastic synthetic resin is selected from a group consisting of polypropylene, noryl, nylon, PBT and PPS.

7. An electrolytic capacitor as claimed in claim 5, said thermosetting synthetic resin is selected from a group consisting of epoxy and phenol.

8. An electrolytic capacitor as claimed in claim 6, said thermosetting synthetic resin is selected from a group consisting of epoxy and phenol.

* * * * *